United States Patent
Lee et al.

(10) Patent No.: US 9,328,444 B2
(45) Date of Patent: May 3, 2016

(54) WASHING MACHINE AND CONTROL METHOD THEREOF

(71) Applicant: SAMSUNG ELECTRONICS CO., LTD., Suwon-si, Gyeonggi-do (KR)

(72) Inventors: Seung Hun Lee, Suwon-si (KR); Sung Mo Lee, Gunpo-si (KR); Jung Won Choi, Goyang-si (KR)

(73) Assignee: SAMSUNG ELECTRONICS CO., LTD., Suwon-Si ( * ) Notice: Subject to any disclaimer, the term of this patent is extended or adjusted under 35 U.S.C. 154(b) by 0 days.

(21) Appl. No.: 14/465,892

(22) Filed: Aug. 22, 2014

(65) Prior Publication Data

US 2015/0061560 A1 Mar. 5, 2015

(30) Foreign Application Priority Data

Sep. 4, 2013 (KR) .................. 10-2013-0106182

(51) Int. Cl.
*H02K 29/08* (2006.01)
*D06F 33/02* (2006.01)
(Continued)

(52) U.S. Cl.
CPC ............... *D06F 33/02* (2013.01); *D06F 37/40* (2013.01); *H02P 6/08* (2013.01); *H02P 29/024* (2013.01); *D06F 17/08* (2013.01); *D06F 2202/065* (2013.01); *D06F 2204/065* (2013.01)

(58) Field of Classification Search
CPC .......... D06F 2202/065; D06F 2202/12; D06F 33/02; D06F 37/304; D06F 37/40; D06F 39/003; H02P 6/12; H02P 6/165; H02P 6/18; H02P 6/205; H02P 7/093; Y02B 40/52; Y02B 29/49009; Y02B 29/49169

USPC ............... 318/400.02, 400.38, 430; 68/12.01, 68/12.04, 131, 133, 140; 8/137

See application file for complete search history.

(56) References Cited

U.S. PATENT DOCUMENTS

| | | | | |
|---|---|---|---|---|
| 5,012,658 A | * | 5/1991 | Shikamori | .............. D06F 13/02 68/12.01 |
| 5,176,011 A | * | 1/1993 | Imai | ...................... D06F 37/304 68/12.02 |

(Continued)

FOREIGN PATENT DOCUMENTS

| | | |
|---|---|---|
| JP | 11-276783 | 10/1999 |
| KR | 10-2005-009507 | 9/2005 |

OTHER PUBLICATIONS

Espacenet—Bibliographic Data, Publication No. JPH11276783 (A), published Oct. 12, 1999.

(Continued)

*Primary Examiner* — Paul Ip
(74) *Attorney, Agent, or Firm* — Staas & Halsey LLP

(57) ABSTRACT

A washing machine and a control method thereof capable of determining whether a driving motor is locked. A pulsator is rotatably mounted in a spin basket, a driving motor generates rotational force, a clutch transmits the rotational force to the pulsator or the spin basket, a driving circuit supplies a driving current to the driving motor, and a control unit controls the driving circuit and the clutch so that the pulsator rotates in a forward or reverse direction and rotation of the spin basket is stopped in a washing or rinsing process. The control unit controls the driving circuit so that a motor lock detection current is supplied to the driving motor, and controls the clutch so that, if a rotating speed of the driving motor is less than a reference speed, the rotational force is transmitted only to the pulsator.

15 Claims, 15 Drawing Sheets

(51) Int. Cl.
*H02P 6/08* (2016.01)
*D06F 37/40* (2006.01)
*H02P 29/02* (2016.01)
*D06F 17/08* (2006.01)

(56) References Cited

U.S. PATENT DOCUMENTS

| | | | | | |
|---|---|---|---|---|---|
| 5,293,760 | A * | 3/1994 | Tani | ............... | D06F 39/003 68/12.02 |
| 6,176,108 | B1 * | 1/2001 | Bae | ............... | D06F 37/40 68/23.7 |
| 6,495,980 | B2 * | 12/2002 | Cho | ............... | D06F 33/02 318/400.02 |
| 6,665,899 | B2 * | 12/2003 | Lee | ............... | F16D 11/12 68/12.12 |
| 6,842,928 | B2 * | 1/2005 | Yang | ............... | D06F 37/304 68/12.04 |
| 7,089,769 | B2 * | 8/2006 | Lim | ............... | D06F 37/40 192/69.8 |
| 7,224,177 | B2 * | 5/2007 | Kim | ............... | H02P 6/12 324/765.01 |
| 7,409,737 | B2 * | 8/2008 | Cho | ............... | D06F 37/40 68/12.24 |
| 7,478,547 | B2 * | 1/2009 | Okazaki | ............... | D06F 39/003 68/12.04 |
| 7,484,258 | B2 * | 2/2009 | Kim | ............... | D06F 33/02 68/12.04 |
| 2002/0050011 | A1 * | 5/2002 | Cho | ............... | D06F 33/02 8/159 |
| 2002/0166349 | A1 * | 11/2002 | Lim | ............... | D06F 37/40 68/23.7 |
| 2003/0009832 | A1 * | 1/2003 | Yang | ............... | D06F 37/304 8/159 |
| 2003/0131636 | A1 * | 7/2003 | Lim | ............... | D06F 37/40 68/23.7 |
| 2003/0182975 | A1 * | 10/2003 | Tomigashi | ............... | D06F 37/304 68/12.04 |
| 2003/0217417 | A1 * | 11/2003 | Jung | ............... | D06F 35/00 8/158 |
| 2004/0261197 | A1 * | 12/2004 | Cho | ............... | D06F 37/304 8/158 |
| 2005/0015890 | A1 * | 1/2005 | Kim | ............... | D06F 33/02 8/158 |
| 2005/0212548 | A1 * | 9/2005 | Kim | ............... | H02P 6/12 324/765.01 |
| 2008/0041114 | A1 * | 2/2008 | Dickerson | ............... | D06F 37/40 68/12.01 |
| 2008/0263784 | A1 * | 10/2008 | Cho | ............... | D06F 37/304 8/159 |
| 2011/0016640 | A1 * | 1/2011 | Kim | ............... | D06F 33/02 8/137 |
| 2011/0131734 | A1 * | 6/2011 | Kim | ............... | D06F 35/0006 8/137 |
| 2011/0131735 | A1 * | 6/2011 | Park | ............... | D06F 33/02 8/137 |
| 2011/0179584 | A1 * | 7/2011 | Kim | ............... | D06F 37/40 8/137 |
| 2011/0192655 | A1 * | 8/2011 | Kim | ............... | D06F 37/12 177/1 |
| 2012/0005840 | A1 * | 1/2012 | Jang | ............... | D06F 33/02 8/137 |
| 2012/0006065 | A1 * | 1/2012 | Jung | ............... | D06F 33/02 68/12.02 |
| 2012/0151970 | A1 * | 6/2012 | Leibman | ............... | D06F 39/00 68/17 R |
| 2012/0180532 | A1 * | 7/2012 | Park | ............... | D06F 17/10 68/133 |
| 2013/0036773 | A1 * | 2/2013 | Choi | ............... | D06F 37/40 68/140 |
| 2013/0055769 | A1 * | 3/2013 | Ha | ............... | D06F 23/04 68/133 |
| 2013/0199247 | A1 * | 8/2013 | Lee | ............... | D06F 37/30 68/131 |
| 2013/0239336 | A1 * | 9/2013 | Kim | ............... | D06F 33/02 8/137 |

OTHER PUBLICATIONS

KIPRIS, Publication No. 1020050095073, published Sep. 29, 2005.

* cited by examiner (a)

(b)

(a)

(b)

(a)

(b)

(a)

(b)

(a)

(b)

WASHING MACHINE AND CONTROL METHOD THEREOF

CROSS-REFERENCE TO RELATED APPLICATION

This application claims the benefit of Korean Patent Application No. 10-2013-0106182, filed on Sep. 4, 2013 in the Korean Intellectual Property Office, the disclosure of which is incorporated herein by reference.

BACKGROUND

1. Field

Embodiments of the present invention relate to a washing machine and a control method thereof to detect whether a drive motor to drive a washing machine is locked or not.

2. Description of the Related Art

A washing machine is an appliance that removes dirt from laundry using friction between laundry and water by rotation of a spin basket which contains laundry and water. In general, a washing machine performs a series of processes including washing, rinsing and dehydration.

A fully automatic washing machine includes a spin basket rotatably mounted in a tub and a pulsator rotatably mounted in the spin basket, thereby washing laundry using water current generated by the pulsator. The washing machine further includes a clutch to selectively transmit rotational force generated by a drive motor to the spin basket and the pulsator.

In the washing or rinsing process, the clutch operates to transmit rotational force from the drive motor to the pulsator. In the dehydration process, the clutch operates to transmit rotational force from the drive motor to both the pulsator and the spin basket.

The spin basket is kept in a stationary state in the washing or rinsing process. However, due to erroneous operation of the clutch, rotational force from the drive motor may be unexpectedly transmitted to the spin basket through the clutch. In such a case, the rotational force from the drive motor is applied to the clutch, which may damage the clutch.

SUMMARY

It is an aspect of the present invention to provide a washing machine and a control method thereof to detect whether a drive motor to drive a washing machine is locked or not in a washing or rinsing process and to perform the washing or rinsing process after rectifying a clutch upon determining that the drive motor is locked.

Additional aspects of the invention will be set forth in part in the description which follows and, in part, will be obvious from the description, or may be learned by practice of the invention.

In accordance with one aspect of the present invention, a washing machine includes a spin basket rotatably mounted therein, a pulsator mounted in the spin basket in order to generate water current, a driving motor to generate rotational force, a clutch to transmit the rotational force generated from the driving motor to at least one of the pulsator and the spin basket, a driving circuit to supply a driving current to the driving motor, and a controller to control the driving circuit and the clutch so that the pulsator rotates in a forward or reverse direction and rotation of the spin basket is stopped in a washing or rinsing process. The controller controls the driving circuit so that a motor lock detection current is supplied to the driving motor, and controls the clutch so that, if a rotating speed of the driving motor is less than a reference speed, the rotational force is transmitted only to the pulsator.

The controller may include a drive controller to control operation of the driving circuit, and a main controller to transmit a target speed command to the drive controller or transmit a motor lock detection current command to the drive controller.

If the drive controller receives the target speed command, the drive controller may control the driving circuit so that the rotating speed of the driving motor becomes the target speed. If the drive controller receives the motor lock detection current command, the drive controller may control the driving circuit so that the motor lock detection current is supplied to the driving motor.

The motor lock detection current may be a current of about 0.5 A to about 1.5 A supplied for about 0.3 seconds to about 1 second.

The drive controller may include a speed calculator to detect the rotating speed of the driving motor, a speed controller to calculate a target current to be supplied to the driving motor on the basis of difference between the rotating speed of the driving motor and the target speed, and a current controller to calculate a target voltage to be applied to the driving motor on the basis of difference between the target current and the driving current. If the motor lock detection current command is input, the current controller may calculate a target voltage to be applied to the driving motor on the basis of a difference between the motor lock detection current and the driving current.

The clutch may include a clutch spring configured to transmit the rotational force to the spin basket and the pulsator if the clutch spring constricts and to transmit the rotational force to the pulsator if the clutch spring expands, and a ratchet configured to expand the clutch spring.

If the rotating speed of the driving motor is less than the reference speed, the controller may control the ratchet to expand the clutch spring.

If the rotating speed of the driving motor is greater than the reference speed, the controller may control the driving circuit to rotate the pulsator in a forward or reverse direction.

The controller may determine whether the pulsator will rotate in a forward direction or not, and upon determining that the pulsator will rotate in a forward direction, the controller may control the driving circuit to supply the motor lock detection current to the driving motor.

In accordance with another aspect of the present invention, a control method of a washing machine, which includes a spin basket, a pulsator to generate water current, a driving motor to generate rotational force, and a clutch to transmit the rotational force to at least one of the pulsator and the spin basket, includes supplying a motor lock detection current to the driving motor, detecting a rotating speed of the driving motor, comparing the rotating speed with a predetermined reference speed, and if the rotating speed is less than the reference speed, transmitting the rotational force only to the pulsator.

The supplying of the motor lock detection current may include supplying a current of about 0.5 A to about 1.5 A to the driving motor for about 0.3 seconds to about 1 second.

The detecting of the rotating speed of the driving motor may include detecting a rotational displacement of a rotor included in the driving motor and calculating the rotating speed of the driving motor on the basis of the detected rotational displacement.

The transmitting of the rotational force only to the pulsator may include expanding a clutch spring included in the clutch so as to transmit the rotational force to the pulsator.

The control method may further include, if the rotating speed is greater than the reference speed, supplying a driving current to the driving motor so that the pulsator rotates in a forward or reverse direction.

The supplying of the motor lock detection current may include determining whether the driving motor will rotate in a forward direction and, upon determining that the driving motor will rotate in a forward direction, supplying the motor lock detection current to the driving motor.

As described above, the washing machine and the control method thereof are capable of determining whether the driving motor is locked or not by supplying the motor lock detection current to the driving motor and detecting the rotating speed of the driving motor.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
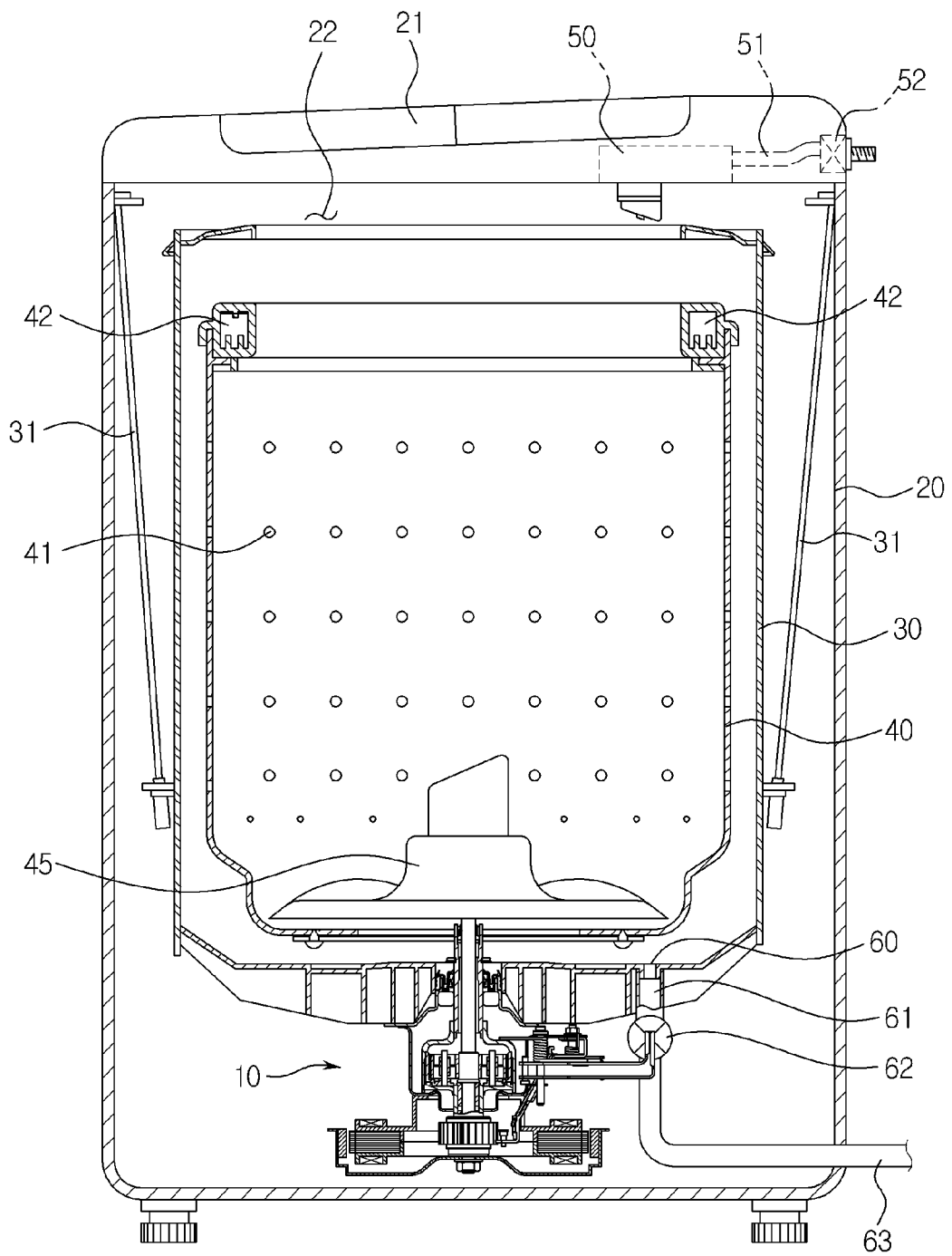
FIG. 1 is a sectional view illustrating a washing machine according to an embodiment of the present invention.

Reference will now be made in detail to the embodiments of the present invention, examples of which are illustrated in the accompanying drawings, wherein like reference numerals refer to like elements throughout.

FIG. 1 is a sectional view illustrating a washing machine according to an embodiment of the present invention.

As shown in FIG. 1, a washing machine 1 includes a cabinet 20 defining an external appearance thereof, a tub 30 disposed in the cabinet 20 to store water therein, a spin basket 40 rotatably mounted in the tub 30, a pulsator 45 mounted in the spin basket 40 to generate water current, and a driving device 10 to rotate the spin basket 40 or the pulsator 45.

The cabinet 20 is formed with a laundry entrance hole 22 at an upper portion thereof, through which a user places laundry in the spin basket 40. A door 21 is mounted to the upper portion of the cabinet 20 to open and close the laundry entrance hole 22.

The tub 30 is suspended from the cabinet 20 by a suspension device 31 which connects an outer lower portion of the tub 30 to an inner upper portion of the cabinet 20. The suspension device 31 serves to attenuate vibration which is generated from the tub 30 during the washing or dehydration process.

A water supply hose 51, through which wash water is supplied to the tub 30, is disposed above the tub 30. One end portion of the water supply hose 51 is connected to an external water supply source (not shown), and the other end portion of the water supply hose 51 is connected to a detergent supply device 50. Water supplied through the water supply hose 51 flows into the tub 30 together with a detergent via the detergent supply device 50. The water supply hose 51 is mounted with a water supply valve 52 to control water supply.

The spin basket 40 is formed in a cylindrical shape having an opened top portion and receives laundry therein. The spin basket 40 is formed with a plurality of through-holes 41 at a side surface thereof, through which an internal space of the spin basket 40 communicates with an internal space of the tub 30. A balancer 42 is mounted to an upper portion of the spin basket 40 in order to counterbalance an unbalanced load of the spin basket 40 during high-speed rotation of the spin basket 40, thereby ensuring stable rotation of the spin basket 40.

The pulsator 45 rotates in a forward or reverse direction and generates water current. Laundry in the spin basket 40 is agitated by the water current generated by the pulsator 45 and washed by friction.

A drain hole 60 is formed at a bottom of the tub 30 in order to discharge water from the tub 30. A first drain hose 61 is connected to the drain hole 60 and is mounted with a drain valve 62 to control drainage.

A second drain hose 63 is connected to an outlet of the drain valve 62 in order to discharge water to the outside. The drain valve 62 may be configured as a solenoid device, a link device connected to an electric motor (not shown) or the like.

The driving device 10 is disposed below the tub 30 and selectively supplies rotational force to the spin basket 40 or the pulsator 45. In particular, during the washing and rinsing processes, the driving device 10 supplies rotational force in a forward or reverse direction to the pulsator 45. During the dehydration process, the driving device 10 supplies rotational force in the reverse direction to the spin basket 40 and the pulsator 45.

Hereinafter, the driving device will be explained in detail.

Figure 2:
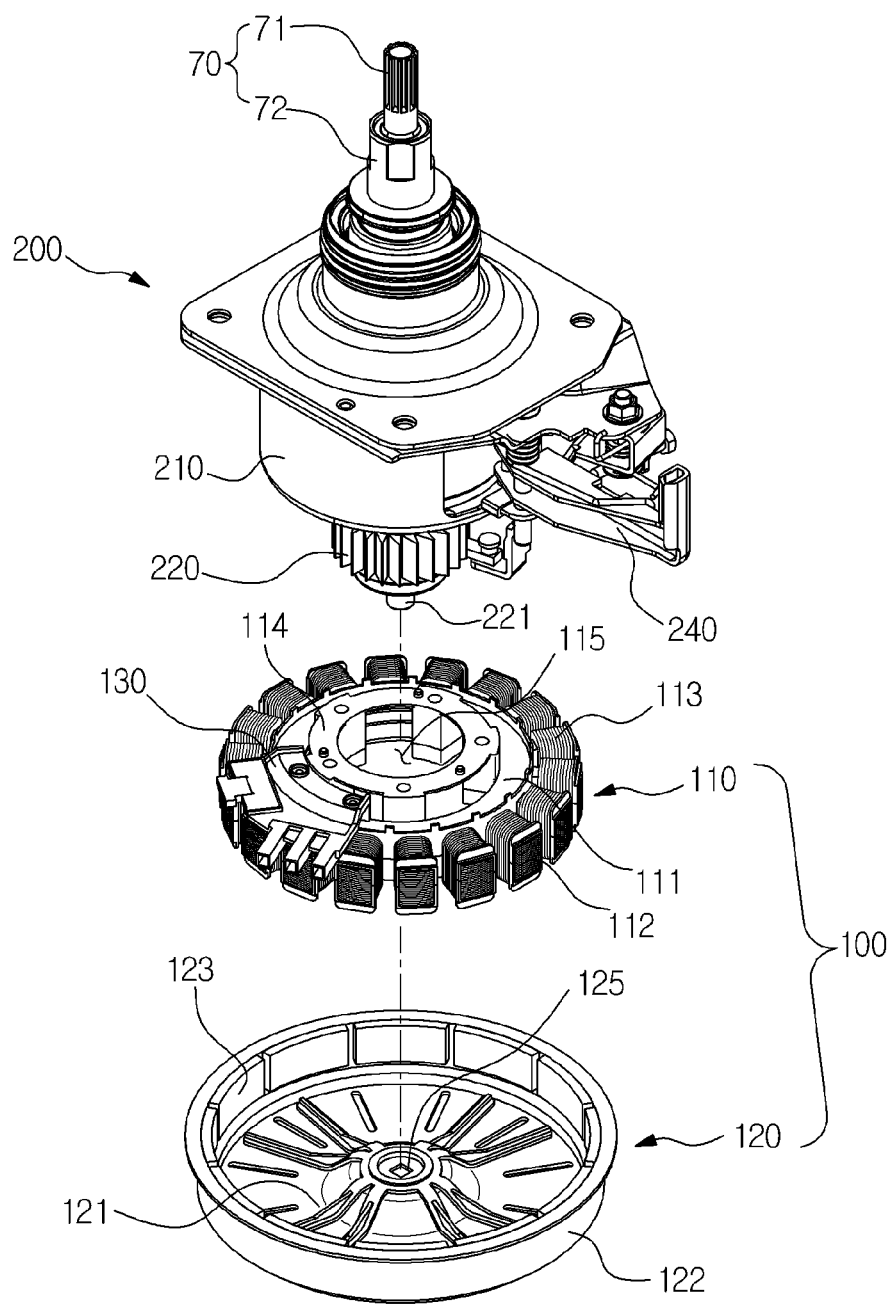
FIG. 2 is an exploded perspective view illustrating constitution of a driving device in the washing machine according to an embodiment of the present invention.
Figure 3:
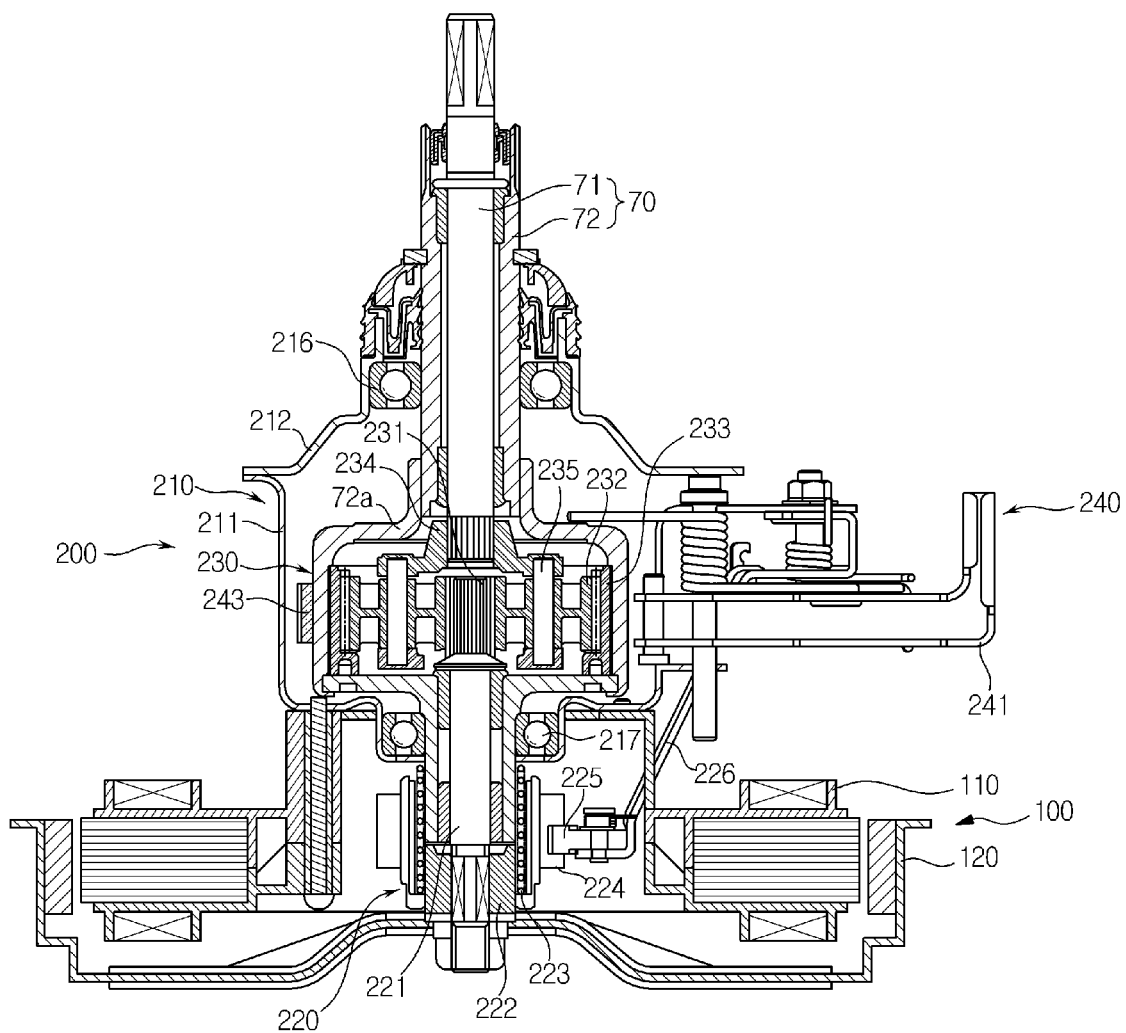
FIG. 3 is a side sectional view of the driving device in the washing machine according to an embodiment of the present invention.
Figure 4:
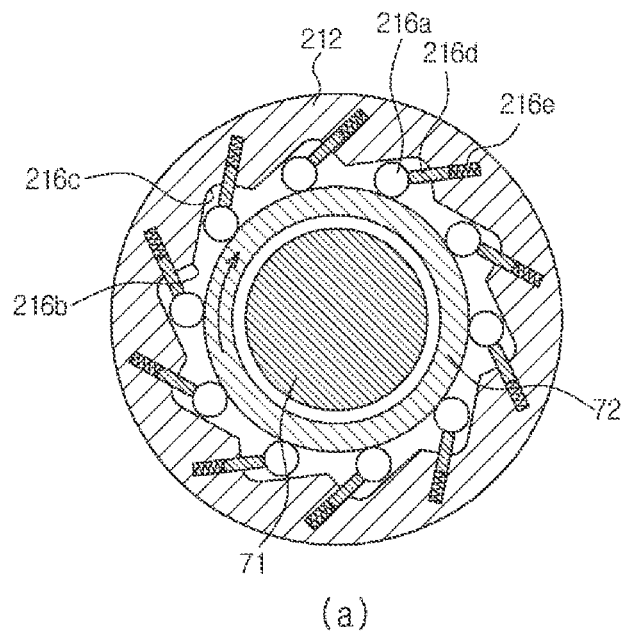
FIG. 4 is a view illustrating operation of a one-way bearing in the washing machine according to an embodiment of the present invention.
Figure 4:
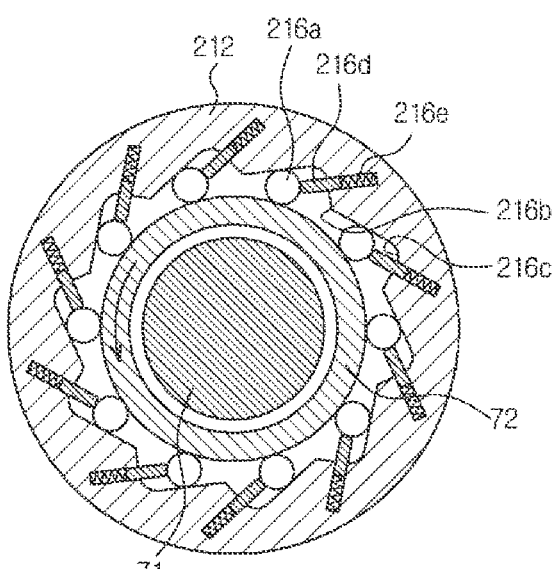
Figure 5:
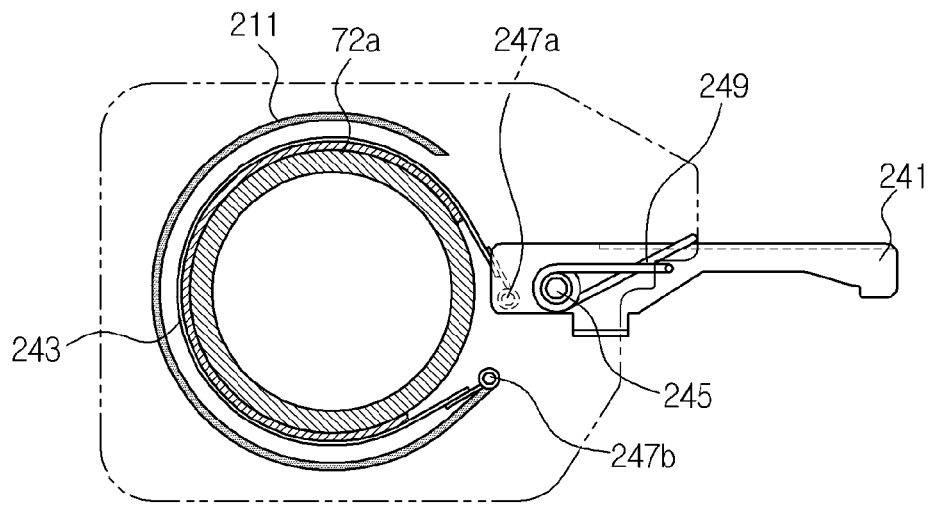
FIG. 5 is a view illustrating operation of a brake assembly in the washing machine according to an embodiment of the present invention.
Figure 5:
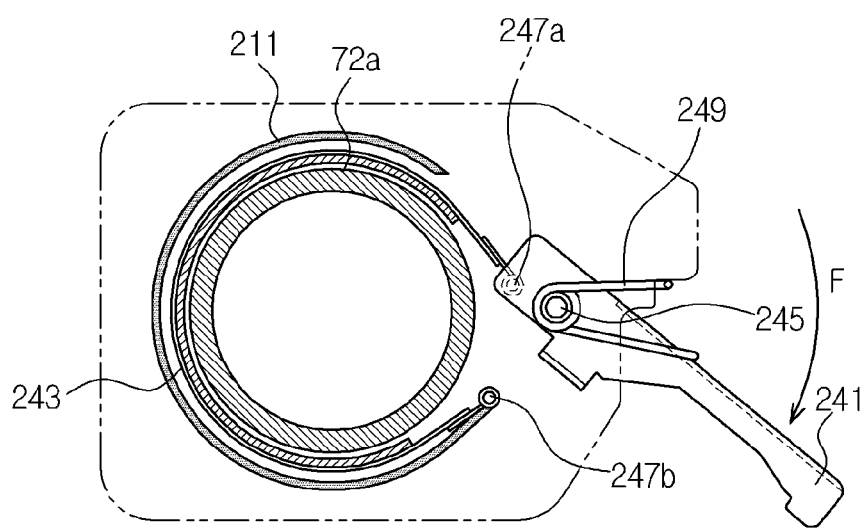

FIG. 2 is an exploded perspective view illustrating constitution of the driving device in the washing machine according to an embodiment of the present invention, FIG. 3 is a side sectional view of the driving device in the washing machine according to an embodiment of the present invention, FIG. 4 is a view illustrating operation of a one-way bearing in the washing machine according to an embodiment of the present invention, and FIG. 5 is a view illustrating operation of a brake assembly in the washing machine according to an embodiment of the present invention.

Referring to FIGS. 2 through 5, the driving device 10 includes a driving motor 100 to generate driving force by power applied thereto, a driving shaft 70 to transmit the rotational force generated from the driving motor 100 to the spin basket 40 and the pulsator 45, and a clutch 200 to control rotation of the driving shaft 70 so as to enable the pulsator 45 and the spin basket 40 to rotate simultaneously or selectively. The driving device 10 has a series structure in which the driving motor 100, the clutch 200 and the driving shaft 70 are aligned with each other. Accordingly, a rotating speed and torque of the spin basket 40 may be primarily controlled using the driving motor 100, and may be secondarily controlled using the clutch 200.

The driving shaft 70 includes a dehydration shaft 72 to transmit rotational force to the spin basket 40 and a wash shaft 71 to rotate the pulsator 45. The dehydration shaft 72 has a hollow structure, and the wash shaft 71 and a rotation shaft 221 of the clutch 200 (described later) are positioned in the hollow space of the dehydration shaft 72. A reduction gear accommodation part 72a, which accommodates a reduction gear assembly 230 (described later) therein, is provided at a middle portion of the dehydration shaft 72.

The driving motor 100 may be a brushless direct current (BLDC) motor capable of diversely controlling a rotating speed thereof. The driving motor 100 includes a stator 110 fixed to the clutch 200, a rotor 120 disposed to surround the stator 110 and configured to rotate by electromagnetic interaction to the stator 110, and a Hall sensor 130 to detect a rotational displacement of the rotor 120.

The stator 110 includes a ring-shaped base 111, a plurality of teeth 112 arranged along the periphery of the base 111 and protruding outward in a radial direction of the stator 110, and coils 113 wound on the teeth 112. The teeth 112 and the coils 113 generate a rotating magnetic field according to current flowing through the coils 113.

A mount surface 114 having a ring shape is formed at a top portion of the base 111. When the stator 110 is coupled to the clutch 200, the clutch 200 is seated on the mount surface 114.

An opening 115 is formed in the middle of the base 111 and the mount surface 114. When the clutch 200 is coupled to the stator 110, a switching gear assembly 220 passes through the opening 115 and are positioned inside the stator 110.

The rotor 120 includes a bottom plate 121 and a sidewall 122 projecting from an edge of the bottom plate 121. A plurality of permanent magnets 123 is adhered to an inner surface of the sidewall 122. The permanent magnets 123 magnetically interact with the coils 113 of the stator 110, thereby rotating the rotor 120.

A coupling hole 125 is formed at the center of the bottom plate 121. The rotation shaft 221 of the clutch 200 is engaged with the rotor 120 through the coupling hole 125 using fastening members.

The rotation shaft 221 engaged with the rotor 120 penetrates the hollow space of the dehydration shaft 72 and is connected to the wash shaft 71 in the reduction gear assembly 230. The wash shaft 71 further penetrates the hollow space of the dehydration shaft 72 and is coupled to the pulsator 45 (refer to FIG. 1).

The Hall sensor 130 is connected to a portion of the top surface of the stator 110. The Hall sensor 130 detects variation of magnetic field by rotation of the permanent magnets 123 adhered to the rotor 120, and accordingly outputs a rotational displacement of the rotor 120.

The clutch 200 includes a clutch body 210 defining an appearance thereof, the switching gear assembly 220 disposed beneath the clutch body 210 and configured to selectively transmit rotational force from the rotation shaft 221 coupled to the rotor 120 of the driving motor 100 to the wash shaft 71 and the dehydration shaft 72 according to operation of the washing machine, the reduction gear assembly 230 provided in the reduction gear accommodation part 72a of the dehydration shaft 72 and configured to transmit rotational force with a reduced speed of the rotation shaft 221 to the wash shaft 71, and a brake assembly 240 disposed out of the reduction gear accommodation part 72a of the dehydration shaft 72 and configured to stop rotation of the spin basket 40 (refer to FIG. 1).

The clutch body 210 includes a cylindrical housing 211 having an opened upper portion, and a housing cover 212 to cover the opened upper portion of the housing 211.

The driving shaft 70, which extends toward the tub 30, is positioned in the center of the housing cover 212. An upper portion of the housing cover 212 encircles the driving shaft 70 and protrudes toward the tub 30.

The rotation shaft 221, which extends toward the driving motor 100, is positioned in the lower center of the housing 211. A lower portion of the housing 211 encircles the rotation shaft 221 and protrudes toward the driving motor 100.

An upper bearing 216 is disposed between the housing cover 212 and the dehydration shaft 72, and a lower bearing 217 is disposed between the housing 211 and the rotation shaft 221, thereby ensuring smooth rotation of the dehydration shaft 72 and the rotation shaft 221. The upper bearing 216 is configured as a one-way bearing which allows the dehydration shaft 72 to rotate only in one direction. That is, the upper bearing 216 allows the dehydration shaft 72 to rotate only in a forward direction, but prohibits the dehydration shaft 72 from rotating in a reverse direction.

As shown in FIG. 4, the upper bearing 216 includes locking balls 216a to permit or prohibit rotation of the dehydration shaft 72, bearing crests 216b and bearing valleys 216c formed at an inner surface of the housing cover 212, plungers 216d to make the locking balls 216a contact the dehydration shaft 72, and plunger springs 216e to pressurize the plungers 216d toward the dehydration shaft 72.

As shown in FIG. 4a, if the dehydration shaft 72 rotates clockwise (in a forward direction), the locking balls 216a are pushed toward the bearing valleys 216c by friction between the dehydration shaft 72 and the locking balls 216a. In addition, the plungers 216d and the plunger springs 216e disposed at the bearing valleys 216c bias the locking balls 216a toward the bearing crests 216b. As a result, the locking balls 216a are located between the dehydration shaft 72 and the bearing crests 216b with a slight gap therefrom. Accordingly, the locking balls 216a allow the dehydration shaft 72 to rotate smoothly.

Conversely, as shown in FIG. 4b, if the dehydration shaft 72 rotates counterclockwise (in a reverse direction), the locking balls 216a are pushed toward the bearing crests 216b by friction between the dehydration shaft 72 and the locking balls 216a. As a result, the locking balls 216a are caught between the dehydration shaft 72 and the bearing crests 216b, thereby prohibiting rotation of the dehydration shaft 72.

By the above-described operational principle, the upper bearing 216 allows smooth rotation of the dehydration shaft 72 in a forward direction, but prohibits rotation of the dehydration shaft 72 in reverse.

The clutch body 210 is supported by the tub 30 through the housing cover 212 fixed to the bottom of the tub 30, and supports the stator 110 through the housing 211 fixed to the top of the stator 110.

The switching gear assembly 220 includes the rotation shaft 221 disposed in the hollow space of the dehydration shaft 72 and configured to receive rotational force from the driving motor 100, a rotation shaft boss 222 having the same diameter as the dehydration shaft 72 and coupled to the rotation shaft 221, a clutch spring 223 to encircle the dehydration shaft 72 and the rotation shaft boss 222 and configured to selectively transmit rotational force from the rotation shaft 221 to the dehydration shaft 72, a sleeve 224 disposed outside the clutch spring 223, a ratchet 225 disposed adjacent to the sleeve 224 and configured to change the diameter of the clutch spring 223, and a clutch lever 226 connected to the ratchet 225.

One end of the clutch spring 223 is connected to the dehydration shaft 72, and the other end of the clutch spring 223 is connected to the sleeve 224. The clutch spring 223 may constrict or expand according to operation of the ratchet 225. In detail, since an inner diameter of the clutch spring 223 is smaller than an outer diameter of the rotation shaft boss 222 and an outer diameter of the dehydration shaft 72, the clutch spring 223 is originally maintained in a constricted state. If the ratchet 225 operates (as described later), the clutch spring 223 expands. When the clutch spring 223 constricts, rotational force of the rotation shaft 221 is transmitted to the dehydration shaft 72. When the clutch spring 223 expands, rotational force of the rotation shaft 221 is not transmitted to the dehydration shaft 72.

According to operation of the clutch lever 226 connected to the ratchet 225, the ratchet 225 may come into contact with the sleeve 224 to rotate the sleeve 224 in a direction of expanding the clutch spring 223, or may be separated from the sleeve 224.

Operation of the switching gear assembly 220 will now be explained. During the washing or rinsing process, the clutch lever 226 is pulled in a certain direction, so that the ratchet 225 comes into contact with the sleeve 224 and rotates the sleeve 220 in a direction of expanding the clutch spring 223. Like this, if the sleeve 224 rotates by the ratchet 225, the clutch spring 223 disposed inside the sleeve 224 expands, and thus rotational force of the rotation shaft 221 is not transmitted to the dehydration shaft 72. As a result, the wash shaft 71 rotates, but the dehydration shaft 72 is prevented from rotating. Accordingly, the pulsator 45 (refer to FIG. 1) connected to the wash shaft 71 rotates, but the spin basket 40 (refer to FIG. 1) connected to the dehydration shaft 72 does not rotate.

To the contrary, if the clutch lever 226 is pulled in another direction during the dehydration process, the ratchet 225 is separated from the sleeve 224, and the clutch spring 223, which has expanded by rotation of the sleeve 224, constricts again. The clutch spring 223 transmits rotational force from the rotation shaft 221 to the dehydration shaft 72. As a result, the pulsator 45 (refer to FIG. 1) connected to the wash shaft 71 and the spin basket 40 (refer to FIG. 1) connected to the dehydration shaft 72 rotate together.

The reduction gear assembly 230 is disposed in the reduction gear accommodation part 72a provided at a middle portion of the dehydration shaft 72. The reduction gear assembly 230 includes a sun gear 231 coupled to the rotation shaft 221, a plurality of planet gears 232 arranged around the sun gear 231, an internal gear 233 formed at an inner surface of the reduction gear accommodation part 72a, and a carrier 234 to transmit rotational force by revolution of the planet gears 232 to the wash shaft 71. Each of the planet gears 232 is tooth-engaged with the sun gear 231 at a portion thereof, and is also tooth-engaged with the internal gear 233 at another portion thereof.

If the sun gear 231 rotates, each of the planet gears 232 rotates about a planet gear shaft 235 connected to the carrier 234 and simultaneously revolves around the sun gear 231 together with the planet gear shaft 235 along the internal gear 233. Such revolution of the planet gear shaft 235 is transmitted to the wash shaft 71 through the carrier 234.

The brake assembly 240 includes a brake band 243 disposed outside the reduction gear accommodation part 72a provided at the middle portion of the dehydration shaft 72 and configured to stop rotation of the dehydration shaft 72, and a brake lever 241 connected to the brake band 243.

As shown in FIG. 5, the brake band 243 is fixed by a first hinge 247a provided at the brake lever 241 and a second hinge 247b provided at the housing 211. The brake lever 241 is configured to rotate about a lever shaft 245.

If external force is not exerted on the brake lever 241, as shown in FIG. 5a, the brake lever 241 pulls the brake band 243 using elastic force of a brake spring 249 so that the brake band 243 comes into close contact with the reduction gear accommodation part 72a of the dehydration shaft 72. Accordingly, the brake band 243 prohibits rotation of the reduction gear accommodation part 72a in a clockwise (forward) direction. In detail, because one end portion of the brake band 243 is fixed to the housing 211 by the second hinge 247b, if the reduction gear accommodation part 72a rotates in a clockwise (forward) direction, the brake band 243 comes into close contact with the reduction gear accommodation part 72a and accordingly provides braking force for the reduction gear accommodation part 72a. On the other hand, because the other end portion of the brake band 243 is fixed to the rotatable brake lever 241 by the first hinge 247a, if the reduction gear accommodation part 72a rotates in a counterclockwise (reverse) direction, the brake band 243 pulls the brake lever 241 so that the brake lever 241 rotates. As a result, the brake band 243 does not contact the reduction gear accommodation part 72a and does not provide braking force for the reduction gear accommodation part 72a.

In conclusion, if external force is not exerted on the brake lever 241, the brake band 243 prohibits rotation of the dehydration shaft 72 in a forward direction, but allows rotation of the dehydration shaft 72 in a reverse direction.

If external force is exerted on the brake lever 241, the brake lever 241 rotates in a certain direction (downward direction in FIG. 5b) so that the brake band 243 is separated from the reduction gear accommodation part 72a. As a result, the reduction gear accommodation part 72a, the dehydration shaft 72 and the spin basket 40 (refer to FIG. 1) can freely rotate.

Figure 6:
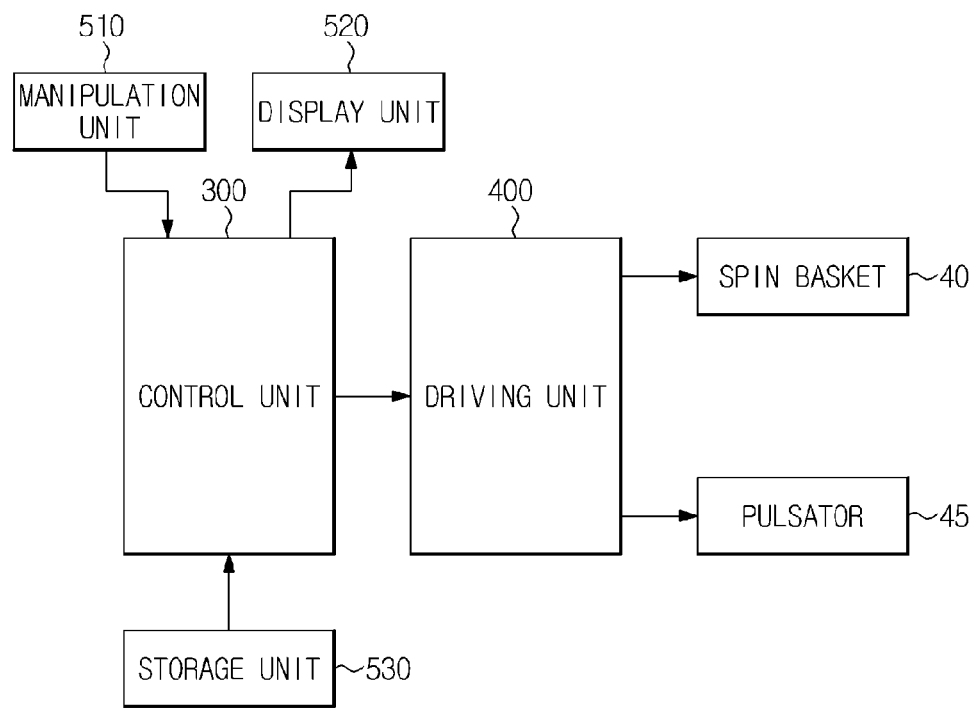
FIG. 6 is a block diagram illustrating a control system in the washing machine according to an embodiment of the present invention.

FIG. 6 is a block diagram illustrating a control system in the washing machine according to an embodiment of the present invention.

Referring to FIG. 6, the washing machine 1 includes a manipulation unit 510 through which a user inputs operation commands, a display unit 520 to display operation information of the washing machine 1, a storage unit 530 to store programs and data related to operation of the washing machine 1, a driving unit 400 to drive the spin basket 40 (refer to FIG. 1) and the pulsator 45, and a control unit 300 to control operation of the washing machine 1.

The manipulation unit 510 may include plural input buttons (not shown) and dials (not shown) through which a user inputs commands for operation of the washing machine 1. The input buttons (not shown) may include a washing course button to select a washing course, a washing time button to input duration of a washing process, a rinse button to input the number of rinsing processes, and a dehydration time button to input duration of a dehydration process. After inputting commands for washing operation through the input buttons (not shown), a user may also input a washing course, a washing time, the number of rinsing processes, a dehydration time or the like using the dials (not shown). The input buttons (not shown) may be configured as a membrane switch, a touch pad or the like.

The display unit 520 includes a display panel (not shown) to display operation information of the washing machine 1 to a user. The display panel (not shown) is configured to display user-input information, such as a washing course, a washing time, the number of rinsing processes, a dehydration time, the remaining washing time or the like. The display panel (not shown) may be configured as a liquid crystal display (LCD), a light emitting diode (LED) or the like.

The storage unit 530 may include a non-volatile memory (not shown), such as a magnetic disk, a solid state disk or the like, to permanently store programs and data for operation control of the washing machine 1, and a volatile memory (not shown), such as a DRAM, an SRAM or the like, to temporarily store temporary data generated during operation control of the washing machine 1.

The driving unit 400 and the control unit 300 will now be described in detail with reference to FIGS. 7 through 9.

Figure 7:
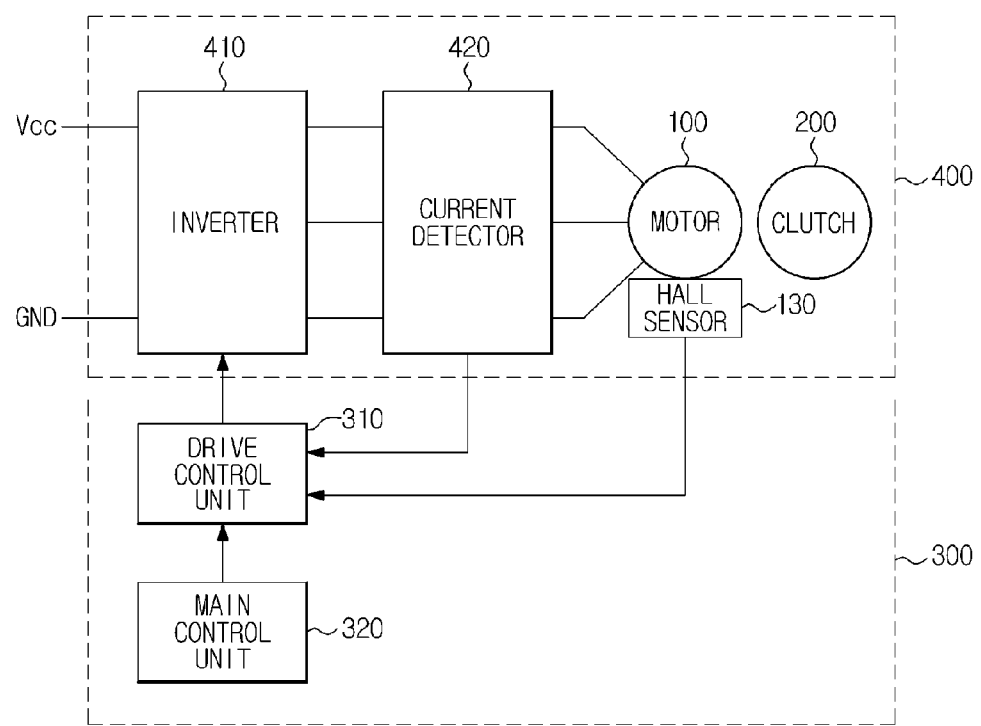
FIGS. 7 through 9 are block diagrams illustrating a control unit and a drive unit in the washing machine according to an embodiment of the present invention.
Figure 8:
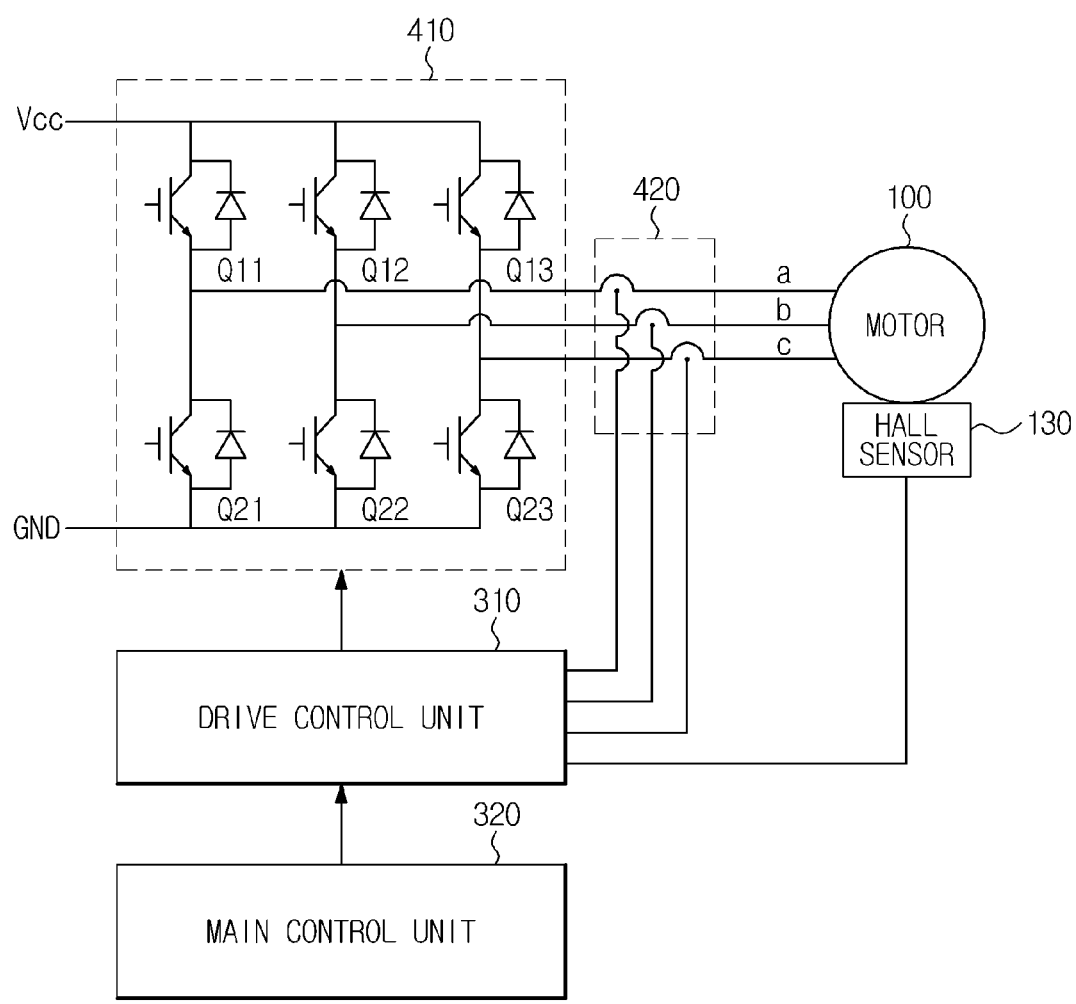
Figure 9:
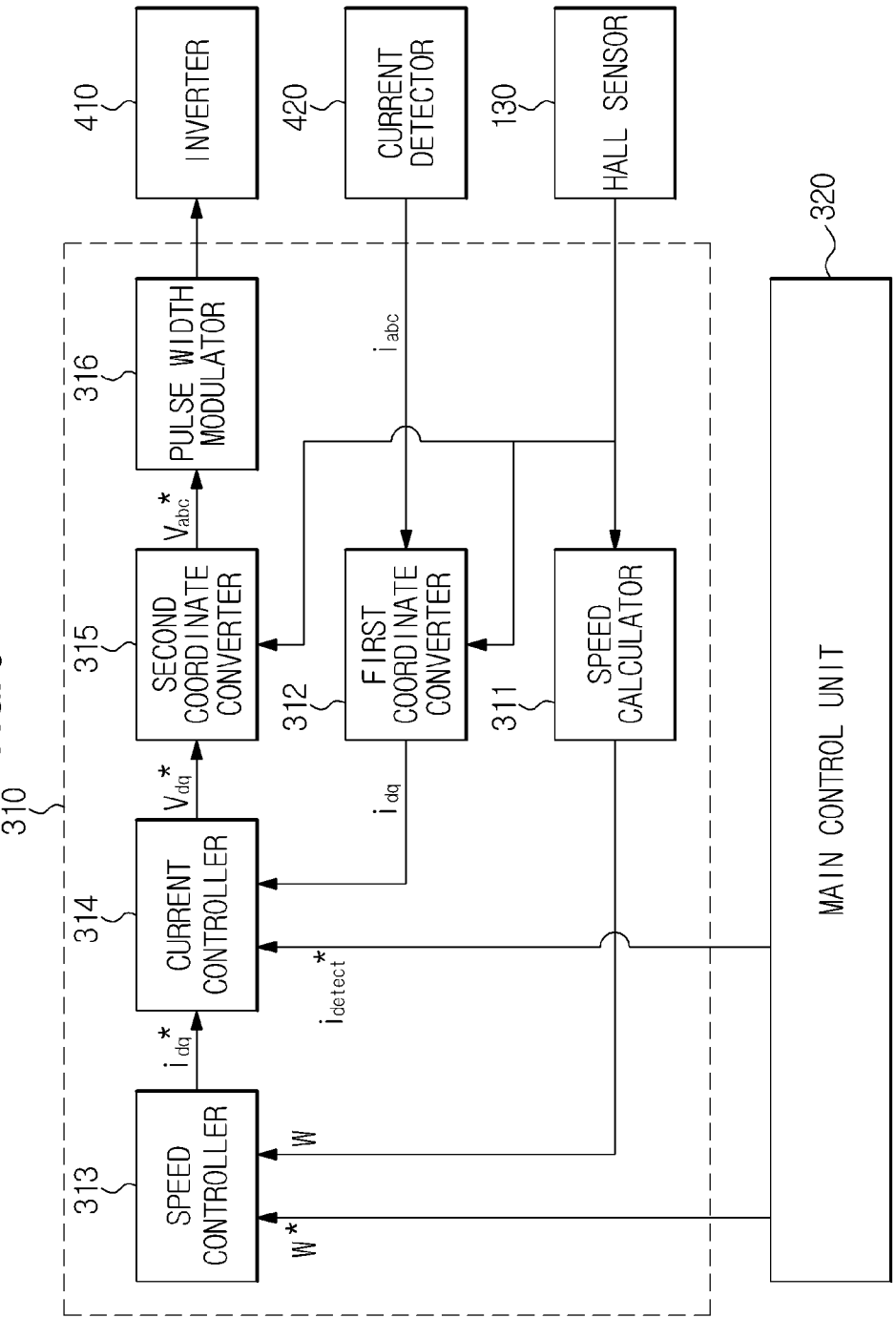

Referring to FIGS. 7 through 9, the driving unit 400 includes the driving motor 100 to generate rotational force, the clutch 200 to transmit rotational force generated from the driving motor 100 to the spin basket 40 (refer to FIG. 1) and the pulsator 45 (refer to FIG. 1), an inverter 410 to supply a driving current to the driving motor 100, and a current detector 420 to detect a driving current value.

Since the driving motor 100 and the clutch 200 have already been described above, the explanation thereof is omitted.

As shown in FIG. 8, the inverter 410 includes three upper switching circuits Q11, Q12 and Q13 and three lower switching circuits Q21, Q22 and Q23. The upper switching circuits Q11, Q12 and Q13 and the lower switching circuits Q21, Q22 and Q23 may include a high voltage switch, such as a high voltage bipolar junction transistor, a high voltage field effect transistor, an insulated gate bipolar transistor (IGBT) or the like, and a free wheeling diode.

In detail, the three upper switching circuits Q11, Q12 and Q13 are connected in parallel with a power source Vcc, and the three lower switching circuits Q21, Q22 and Q23 are connected in parallel with the ground GND. The three upper switching circuits Q11, Q12 and Q13 and the three lower switching circuits Q21, Q22 and Q23 are connected in series with each other in a one-to-one correspondence. Three nodes, at which each of the three upper switching circuits Q11, Q12 and Q13 and each of the three lower switching circuits Q21, Q22 and Q23 are connected, are respectively connected to three input terminals a, b and c of the driving motor 100.

The inverter 410 supplies a driving current to the driving motor 100 by turning any one of the upper switching circuits Q11, Q12 and Q13 and any one of the lower switching circuits Q21, Q22 and Q23 on in predetermined order.

The current detector 420, as shown in FIG. 8, detects a driving current value flowing through the three input terminals a, b and c of the driving motor. In order to detect a driving current value, the current detector 420 detects voltage drop of a shunt resistor which is connected in series with the input terminals a, b and c of the driving motor 100 or detects an output from a voltage divider (not shown) which is connected in parallel with the driving motor 100 between the input terminals a, b and c of the driving motor 100 and the ground GND.

The control unit 300 includes a main control unit 320 to control overall operation of the washing machine 1 and a drive control unit 310 to control operation of the driving unit 400.

The main control unit 320 transmits a speed command w* or a motor lock detection current command idetect* to the drive control unit 310 according to a user's operation command, and controls the display unit 520 (refer to FIG. 6) to display operation information of the washing machine 1 according to the user's operation command. In particular, the main control unit 320 outputs the speed command w* with respect to the driving motor 100 in washing, rinsing and dehydration processes and the motor lock detection current command idetect* to detect whether the driving motor 100 is locked or not in washing and rinsing processes.

As shown in FIG. 9, the drive control unit 310 includes a speed calculator 311, a speed controller 313, a first coordinate converter 312, a current controller 314, a second coordinate converter 315 and a pulse width modulator 316.

The speed calculator 311 calculates a rotating speed w of the driving motor 100 on the basis of a rotational displacement of the rotor 120 (refer to FIG. 2) provided from the Hall sensor 130 included in the driving motor 100, and provides the calculated rotating speed w of the driving motor 100 for the speed controller 313 and the main control unit 320.

The speed controller 313 calculates a d-q axis current command idq* using difference between the speed command w* output from the main control unit 320 and the rotating speed w of the driving motor 100 output from the speed calculator 311, and provides the calculated d-q axis current command idq* for the current controller 314.

The first coordinate converter 312 converts a three-phase driving current value iabc of the driving motor 100 output from a current detector 420 into a d-q axis current value idq on the basis of a rotational displacement of the rotor 120 (refer to FIG. 2) output from the Hall sensor 130, and provides the d-q axis current value idq for the current controller 314.

The current controller 314 calculates a d-q axis voltage command vdq* using difference between the d-q axis current command idq* output from the speed controller 313 and the d-q axis current value idq output from the first coordinate converter 312 or using a difference between the motor lock detection current command idetect* output from the main control unit 320 and the d-q axis current value idq output from the first coordinate converter 312, and provides the calculated d-q axis voltage command vdq* for the second coordinate converter 315.

The second coordinate converter 315 converts the d-q axis voltage command vdq* output from the current controller 314 into a three-phase voltage command vabc* on the basis of a rotational displacement of the rotor 120 (refer to FIG. 2) output from the Hall sensor 130, and provides the three-phase voltage command vabc* for the pulse width modulator 316.

The pulse width modulator 316 outputs a pulse width modulation signal on the basis of the three-phase voltage command vatic* output from the second coordinate converter 315, in order to control the upper switching circuits Q11, Q12 and Q13 and the lower switching circuits Q21, Q22 and Q23 included in the inverter 410.

In summary, the drive control unit 310 outputs a pulse width modulation signal to control the inverter 410 according to the speed command w* or the motor lock detection current command idetect* output from the main control unit 320. If the speed command w* is input to the drive control unit 310 from the main control unit 320, the drive control unit 310 calculates the rotating speed w of the driving motor 100 using a rotational displacement of the rotor 120 (refer to FIG. 2) fed back from the Hall sensor 130 of the driving motor 100, compares the rotating speed w with the speed command w* and controls a driving current of the driving motor 100. In addition, if the motor lock detection current command idetect* is input to the drive control unit 310 from the main control unit 320, the drive control unit 310 feeds forward the motor lock detection current command idetect* to the driving motor 100.

Hereinafter, operation of the washing machine according to an embodiment of the present invention, which is constructed as above, will be described.

If a user selects a washing course, sets detailed conditions for the selected washing course and inputs a washing operation command through the manipulation unit 510 (refer to FIG. 6), the washing machine 1 performs a washing process, a rinsing process and a dehydration process according to the selected washing course and the detailed conditions. Further, the washing machine 1 may perform an intermediate dehydration process between a washing process and a rinsing process and between a rinsing process and a dehydration process.

In a washing process, the washing machine 1 removes dirt from laundry using chemical action between dirt adhered to laundry and a detergent and physical action (water current) by rotation of the pulsator 45 (refer to FIG. 1) in forward and reverse directions.

In a rinsing process, the washing machine 1 removes remaining dirt and detergent residues from laundry using physical action (water current) by rotation of the pulsator 45 (refer to FIG. 1) in forward and reverse directions.

In a dehydration process, the washing machine 1 removes water from laundry using centrifugal force by rotation of the spin basket 40 (refer to FIG. 1) and the pulsator 45 (refer to FIG. 1) in a forward direction.

Figure 10:
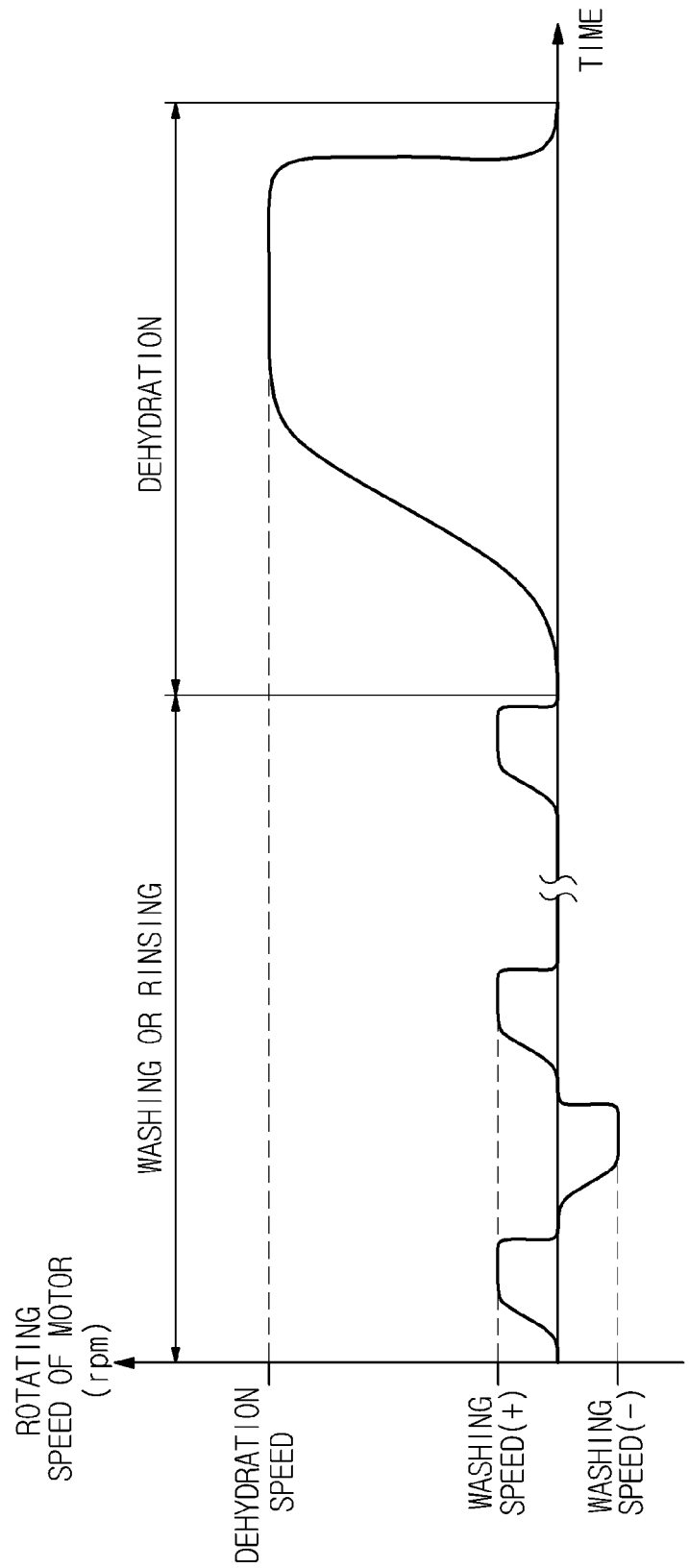
FIG. 10 is a view illustrating a rotating speed and direction of a pulsator and a spin basket in the washing machine according to an embodiment of the present invention.

FIG. 10 is a view illustrating a rotating speed and direction of the pulsator and the spin basket in the washing machine according to an embodiment of the present invention.

As shown in FIG. 10, the pulsator 45 (refer to FIG. 1) rotates at a certain washing speed in forward and reverse directions in a washing or rinsing process, and the spin basket 40 (refer to FIG. 1) and the pulsator 45 (refer to FIG. 1) rotate at a certain dehydration speed in a forward direction in a dehydration process. In other words, a speed command for the washing speed is transmitted to the driving motor 100 in a washing or rinsing process, and a speed command for the dehydration speed is transmitted to the driving motor 100 in a dehydration process.

In a washing or rinsing process, only the pulsator 45 (refer to FIG. 1) rotates in forward and reverse directions by operation of the clutch 200 (refer to FIG. 3).

Referring back to FIGS. 3 through 5, the ratchet 225 rotates the sleeve 224 so that the clutch spring 223 expands, the brake band 243 prohibits forward rotation of the dehydration shaft 72 connected to the spin basket 40, and the one-way bearing 216 prohibits reverse rotation of the dehydration shaft 72. That is, rotational force of the driving motor 100 is prevented from being transmitted to the spin basket 40 through the dehydration shaft 72, and rotation of the dehydration shaft 72 is prohibited.

Here, if the one-way bearing 216 works normally, the clutch spring 223 may be damaged.

In detail, when the driving motor 100 rotates in a reverse direction (direction illustrated in FIG. 4b), if the locking balls 216a are not normally positioned between the dehydration shaft 72 and the bearing crests 216b, the dehydration shaft 72 may rotate in a reverse direction. Additionally, even though the locking balls 216a are positioned between the dehydration shaft 72 and the bearing crests 216b, if frictional force between the locking balls 216a and the dehydration shaft 72 decreases to a value by which the locking balls 216a cannot prohibit rotation of the dehydration shaft 72, the dehydration shaft 72 may rotate in reverse.

If the dehydration shaft 72 rotates in reverse, the clutch spring 223 connected to the dehydration shaft 72 rotates together with the dehydration shaft 72 in reverse, and accordingly the clutch spring 223 constricts. In detail, the sleeve 224 connected to one end of the clutch spring 223 is prohibited from rotating by the ratchet 225, and the other end of the clutch spring 223 rotates in reverse by the dehydration shaft 72. Accordingly, the clutch spring 223 constricts.

If the driving motor 100 rotates in a forward direction after the clutch spring 223 constricts, rotational force in a forward direction generated by the driving motor 100 is transmitted to the dehydration shaft 72 through the clutch spring 223. However, forward rotation of the dehydration shaft 72 is prohibited by the brake band 243. In other words, because the driving motor 100 transmits rotational force to the dehydration shaft 72 through the clutch spring 223 but the dehydration shaft 72 cannot rotate, the clutch spring 223 may be damaged by rotational force of the driving motor 100 applied thereto.

In order to prevent damage of the clutch spring 223, which may be caused by the above-described reason, it is required to detect whether the rotation of the motor is locked or not.

Figure 11:
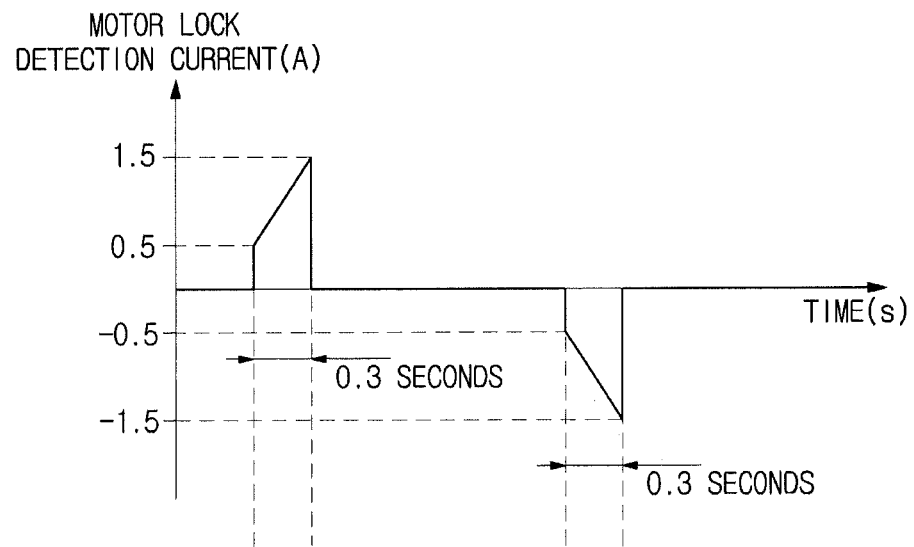
FIGS. 11 and 12 are views illustrating an exemplary motor lock detection current supplied to detect whether a motor is locked or not in the washing machine according to an embodiment of the present invention.
Figure 11:
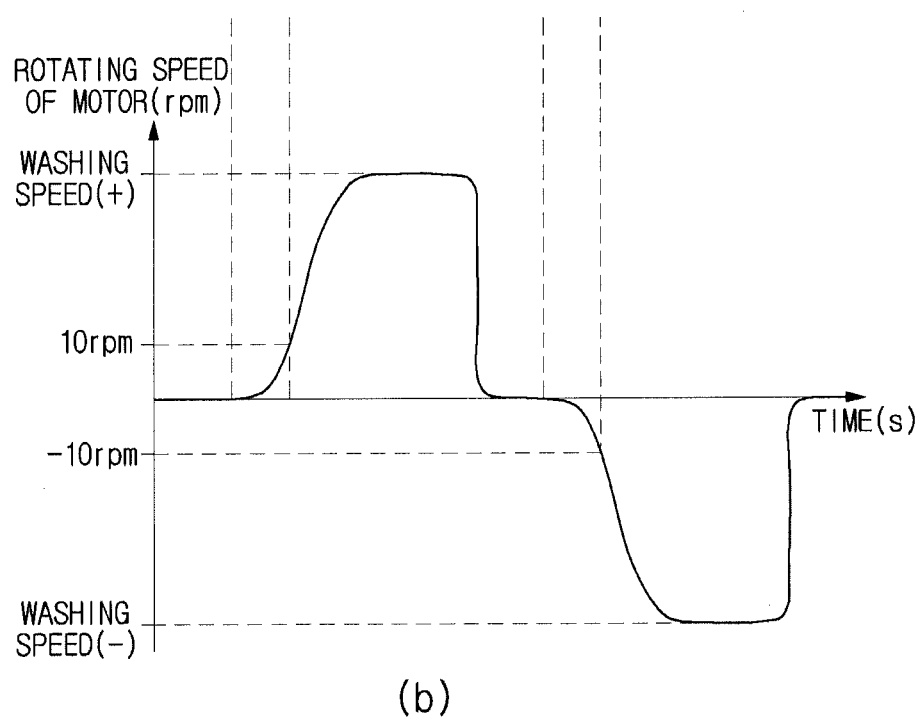
Figure 12:
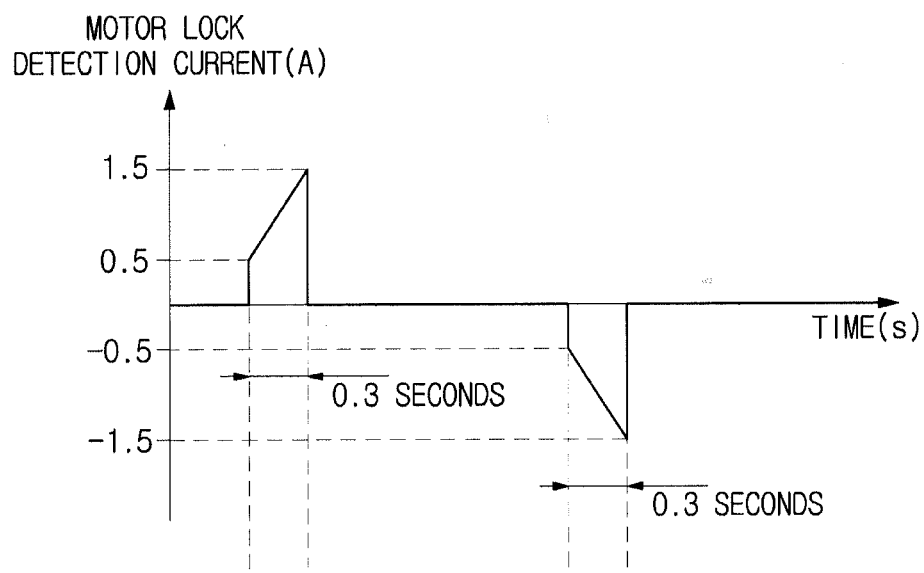
Figure 12:
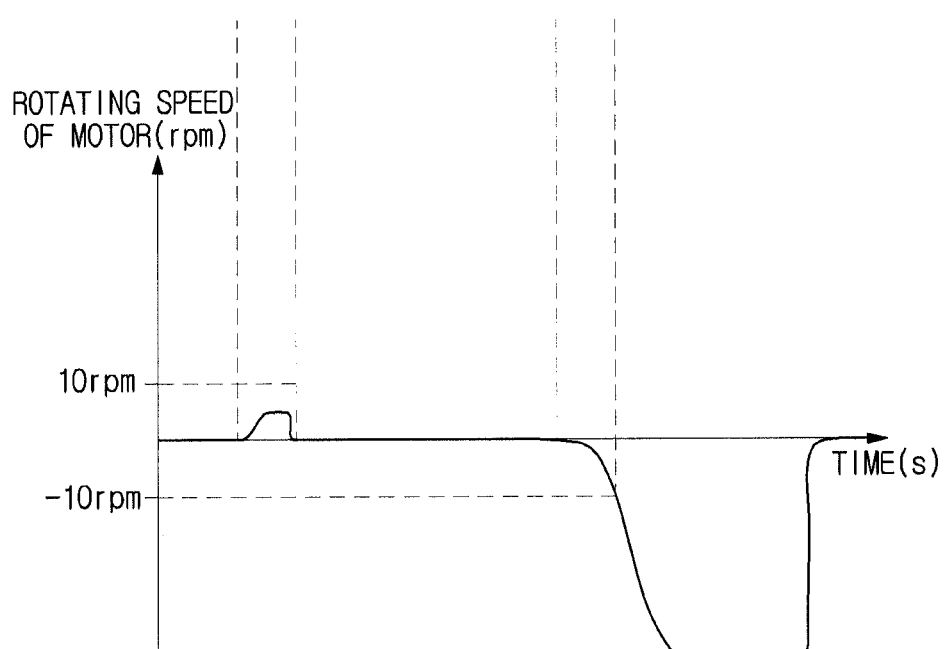

FIGS. 11 and 12 are views illustrating an exemplary motor lock detection current supplied to detect whether the motor is locked or not in the washing machine according to an embodiment of the present invention.

As shown in FIGS. 11 and 12, before the driving motor 100 (refer to FIG. 2) rotates at a certain washing speed, a motor lock detection current idetect is provided to the driving motor 100.

In other words, before the driving motor 100 rotates in a forward or reverse direction, the motor lock detection current idetect is provided to the driving motor 100. Here, the motor lock detection current idetect is a current that rises from about 0.5 A to about 1.5 A in about 0.3 seconds as shown in FIGS. 11a and 12a.

Referring back to FIG. 9, in a washing or rinsing process, the main control unit 320 transmits the motor lock detection current command idetect* to determine whether the driving motor 100 is locked or not to the drive control unit 310 before transmitting the speed command w* to rotate the pulsator 45 (refer to FIG. 1) at a washing speed to the drive control unit 310.

If the drive control unit 310 receives the motor lock detection current command idetect*, the drive control unit 310 feeds forward the motor lock detection current command idetect* so that the inverter 410 supplies the motor lock detection current idetect to the driving motor 100. Then, the drive control unit 310 calculates the rotating speed w of the driving motor 100 on the basis of the output of the Hall sensor 130 provided at the driving motor 100, and provides the calculated rotating speed w for the main control unit 320.

The main control unit 320 compares the rotating speed w of the driving motor 100 with a reference speed. Here, the reference speed is a minimal rotating speed at which the driving motor 100 rotates by the motor lock detection current idetect and may be set to about 10 rpm.

If the rotating speed w of the driving motor 100 is greater than the reference speed, the main control unit 320 transmits the speed command w* to rotate the driving motor 100 at a washing speed to the drive control unit 310. Then, as shown in FIG. 11b, the driving motor 100 rotates at a washing speed by the speed command w* from the main control unit 320.

If the rotating speed w of the driving motor 100 is less than the reference speed, the main control unit 320 determines that the clutch spring 223 (refer to FIG. 3) constricts and does not transmit the speed command w* to the drive control unit 310. Therefore, as shown in FIG. 12b, the driving motor 100 does not rotate. The main control unit 320 controls the clutch lever 226 (refer to FIG. 3) so that the ratchet 225 (refer to FIG. 3) is separated from the sleeve 224 (refer to FIG. 3), and further controls the clutch lever 226 so that the ratchet 225 rotates the sleeve 224 again. Accordingly, the clutch spring 223 expands.

After the clutch spring 223 expands, the main control unit 320 continuously performs a washing process. That is, as shown in FIG. 12, the main control unit 320 provides the motor lock detection current idetect for the driving motor 100 and, if the rotating speed of the driving motor 100 is greater than the reference speed, controls the driving motor 100 to rotate at a washing speed.

Figure 13:
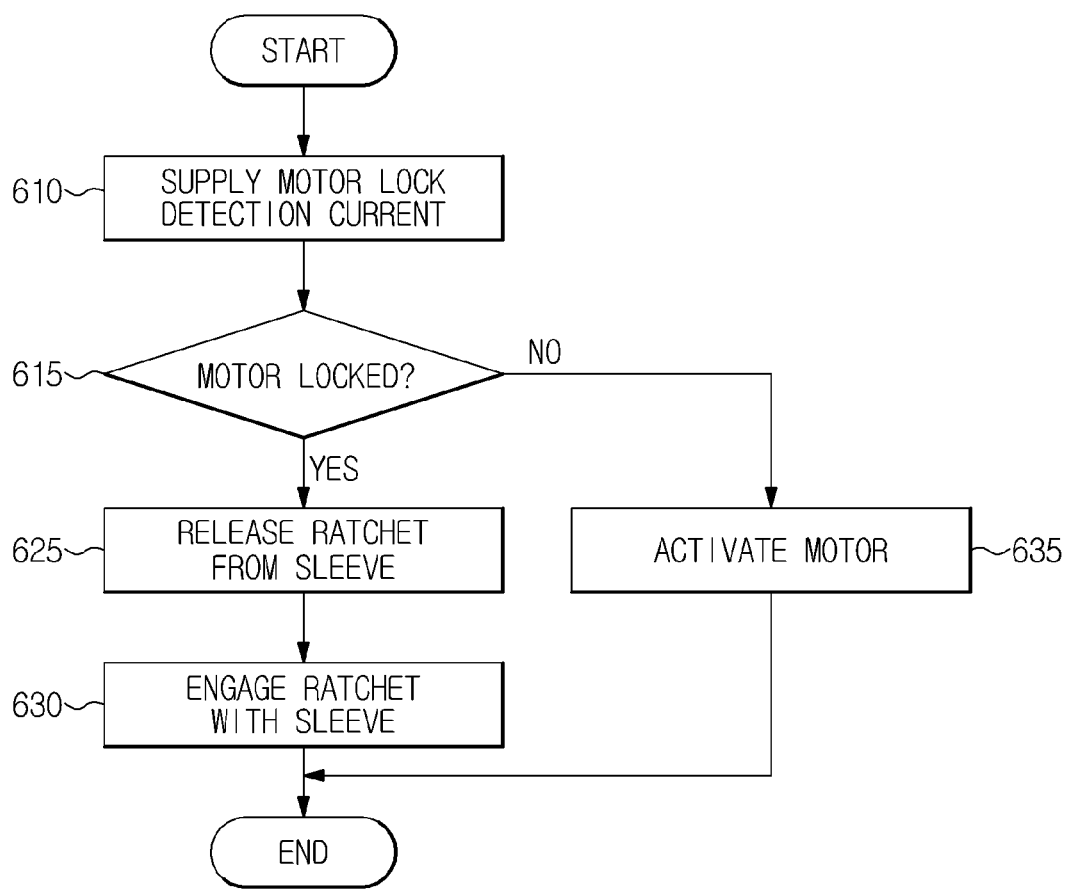
FIG. 13 is a flowchart illustrating exemplary operation of detecting whether the motor is locked or not in the washing machine according to an embodiment of the present invention.

FIG. 13 is a flowchart illustrating exemplary operation of detecting whether the motor is locked or not in the washing machine according to an embodiment of the present invention.

As shown in FIG. 13, the motor lock detection current is first supplied to the driving motor 100 at operation 610. In detail, the main control unit 320 (refer to FIG. 9) transmits the motor lock detection current command idetect* (refer to FIG. 9) to the drive control unit 310 (refer to FIG. 9) configured to control operation of the driving motor 100.

Next, it is determined whether the driving motor 100 is locked or not at operation 615. In detail, the drive control unit 310 detects the rotating speed of the driving motor 100 on the basis of the output of the Hall sensor 130 (refer to FIG. 9) provided at the driving motor 100. Then, the main control unit 310 compares the rotating speed of the driving motor 100 with the reference speed.

Upon determining that the driving motor 100 is locked (YES at operation 615), the ratchet 225 (refer to FIG. 3) is released from the sleeve 224 at operation 625 and then engaged with the sleeve 224 again at operation 630. The main control unit 320 controls the clutch lever 226 so that the ratchet 225 rotates the sleeve 224 again, thereby expanding the clutch spring 223. Accordingly, rotational force of the driving motor 100 is not transmitted to the spin basket 40 (refer to FIG. 1).

Upon determining that the driving motor 100 is not locked (NO at operation 615), the driving motor 100 is activated. In detail, if the rotating speed of the driving motor 100 is greater than the reference speed, it is determined that the driving motor 100 is not locked, and the driving motor 100 is activated to rotate at a washing speed.

Figure 14:
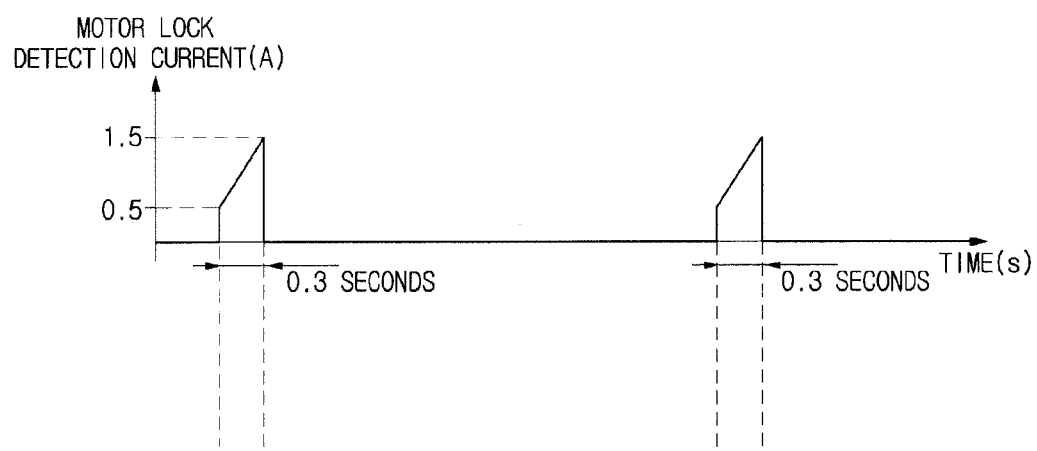
FIG. 14 is a view illustrating another exemplary motor lock detection current supplied to detect whether the motor is locked or not in the washing machine according to an embodiment of the present invention.
Figure 14:
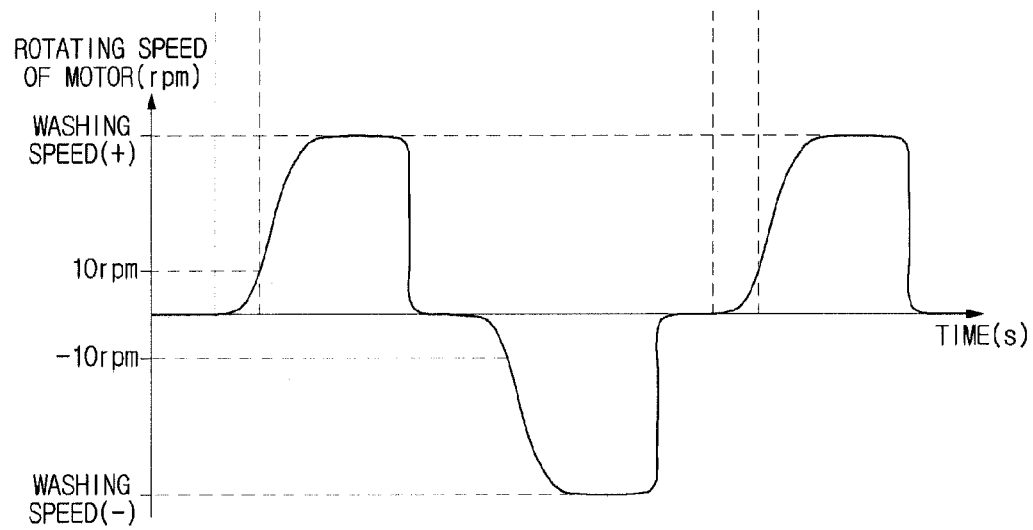

FIG. 14 is a view illustrating another exemplary motor lock detection current supplied to detect whether the motor is locked or not in the washing machine according to an embodiment of the present invention.

Referring to FIG. 14, different from the previous embodiment depicted in FIGS. 11 and 12, the motor lock detection current idetect is supplied to the driving motor 100 only before the driving motor 100 rotates in a forward direction. Here, the motor lock detection current idetect, as shown in FIG. 14a, is a current that rises from about 0.5 A to about 1.5 A in about 0.3 seconds.

Since the process of supplying the motor lock detection current idetect to the driving motor 100 and the process of determining whether the driving motor 100 is locked or not have already been described, explanation thereof is omitted.

The differences from the motor lock detection method described above with reference to FIGS. 11 and 12 are that it is determined whether the driving motor 100 will rotate in a forward direction or not and the motor lock detection current idetect is supplied to the driving motor 100 only when the driving motor 100 will rotate in a forward direction.

As described above, the clutch spring 223 (refer to FIG. 3) constricts when the driving motor 100 rotates in reverse and the rotation of the driving motor 100 is locked when the driving motor 100 rotates in a forward direction. Accordingly, whether the driving motor 100 is locked or not can be sufficiently determined only by determining the locking state of the driving motor 100 before the driving motor 100 rotates in a forward direction.

For this reason, it is first determined whether the driving motor 100 will rotate in a forward direction or not, and then determined whether the driving motor 100 is locked or not before the driving motor 100 rotates in a forward direction.

Figure 15:
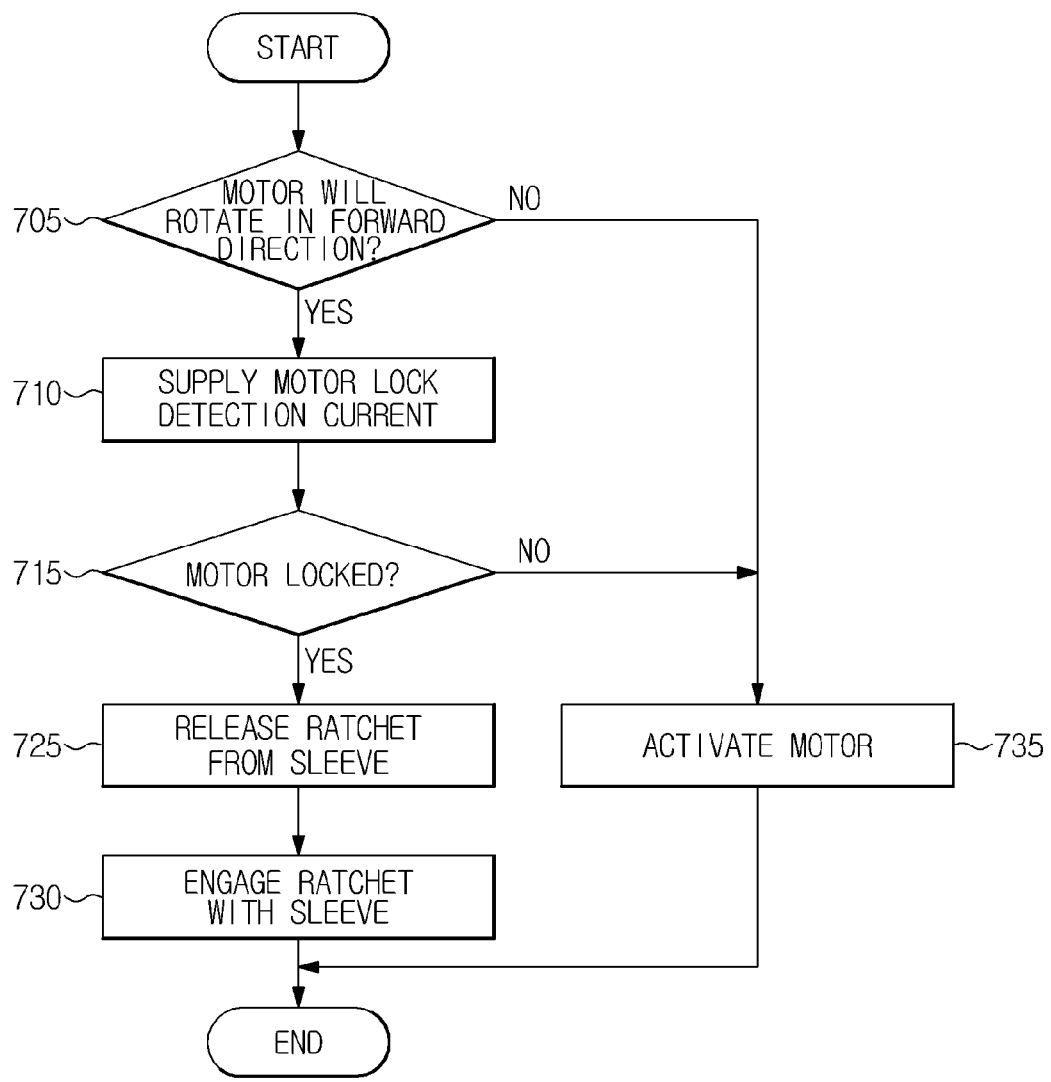
FIG. 15 is a flowchart illustrating another exemplary operation of detecting whether the motor is locked or not in the washing machine according to an embodiment of the present invention.

FIG. 15 is a flowchart illustrating another exemplary operation of detecting whether the motor is locked or not in the washing machine according to an embodiment of the present invention.

As shown in FIG. 15, it is determined whether the driving motor 100 will rotate in a forward direction or not at operation 705.

Upon determining that the driving motor 100 will rotate in reverse (NO at operation 705), the driving motor 100 is activated at operation 735.

Upon determining that the driving motor 100 will rotate in a forward direction (YES at operation 705), the motor lock detection current is supplied to the driving motor 100 at operation 710.

Next, it is determined whether the driving motor 100 is locked or not at operation 715. In detail, the rotating speed of the driving motor 100 is detected and compared with the reference speed.

Upon determining that the driving motor 100 is not locked (NO at operation 715), the driving motor 100 is activated at operation 735.

Upon determining that the driving motor 100 is locked (YES at operation 715), the ratchet 225 (refer to FIG. 3) is released from the sleeve 224 at operation 725 and then engaged with the sleeve 224 again at operation 730. Accordingly, the clutch spring 223 (refer to FIG. 3) expands.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A washing machine comprising:
a spin basket rotatably mounted therein;
a pulsator mounted in the spin basket in order to generate water current;
a driving motor to generate rotational force;
a clutch which is set to transmit the rotational force to the pulsator or set to transmit the rotational force to the pulsator and the spin basket;
a driving circuit to supply a driving current to the driving motor; and
a controller configured to:
set the clutch to transmit the rotational force to the pulsator,
control the driving circuit to supply a lock detection current to the driving motor, detect a rotating speed of the driving motor, and
if the detected rotating speed of the driving motor by supplying the lock detection current is less than a predetermined reference speed, reset the clutch to transmit the rotational force to the pulsator.

2. The washing machine according to claim 1, wherein the controller includes:
a drive controller to control operation of the driving circuit; and
a main controller to transmit a target speed command to the drive controller or transmit a lock detection command to the drive controller.

3. The washing machine according to claim 2, wherein if the drive controller receives the target speed command, the drive controller controls the driving circuit to supply the driving current to the driving motor, such that the rotating speed by the driving current becomes the target speed, and
if the drive controller receives the lock detection command, the drive controller controls the driving circuit to supply the lock detection current to the driving motor.

4. The washing machine according to claim 3, wherein the lock detection current is about 0.5 A to about 1.5 A supplied for about 0.3 seconds to about 1 second to generate about 10 revolutions per minute of the driving motor.

5. The washing machine according to claim 3, wherein the drive controller includes:
a speed calculator to detect the rotating speed of the driving motor;
a speed controller to calculate a target current to be supplied to the driving motor on a basis of a difference between the rotating speed of the driving motor and the target speed; and
a current controller to calculate a target voltage to be applied to the driving motor on a basis of a difference between the target current and the driving current,
wherein if the lock detection command is input, the current controller calculates a target voltage to be applied to the driving motor on a basis of a difference between the lock detection current and the driving current.

6. The washing machine according to claim 1, wherein the clutch includes:
a clutch spring configured to transmit the rotational force to the spin basket and the pulsator if the clutch spring constricts, and to transmit the rotational force to the pulsator if the clutch spring expands; and
a ratchet configured to expand the clutch spring.

7. The washing machine according to claim 6, wherein if the detected rotating speed of the driving motor is less than the predetermined reference speed, the controller controls the ratchet to expand the clutch spring.

8. The washing machine according to claim 1, wherein if the detected rotating speed of the driving motor is greater than the predetermined reference speed, the controller controls the driving circuit to supply a washing current to the driving motor in order to rotate the driving motor at a washing speed.

9. The washing machine according to claim 1, wherein the controller determines whether the pulsator will rotate in a forward direction or not, and
upon determining that the pulsator will rotate in a forward direction, the controller controls the driving circuit to supply the lock detection current to the driving motor.

10. A control method of a washing machine comprising a spin basket, a pulsator to generate water current, a driving motor to generate rotational force, and a clutch which is set to transmit the rotational force to the pulsator or set to transmit the rotational force to the pulsator and the spin basket, the control method comprising:
setting the clutch to transmit the rotational force to the pulsator;
supplying a lock detection current to the driving motor;
detecting a rotating speed of the driving motor; and
if the detected rotating speed is less than a predetermined reference speed, resetting the clutch to transmit the rotational force to the pulsator.

11. The control method according to claim 10, wherein the supplying of the lock detection current includes supplying a current of about 0.5 A to about 1.5 A to the driving motor for about 0.3 seconds to about 1 second to generate about 10 revolutions per minute of the driving motor.

12. The control method according to claim 10, wherein the detecting of the rotating speed of the driving motor includes:
detecting a rotational displacement of a rotor included in the driving motor; and
calculating the rotating speed of the driving motor on a basis of the detected rotational displacement.

13. The control method according to claim 10, wherein the resetting of includes expanding a clutch spring included in the clutch so as to transmit the rotational force to the pulsator.

14. The control method according to claim 10, further comprising:
if the detected rotating speed is greater than the predetermined reference speed, supplying a washing current to the driving motor in order to rotate the driving motor at a washing speed.

15. The control method according to claim 10, wherein the supplying of the lock detection current includes:
determining whether the driving motor will rotate in a forward direction; and
upon determining that the driving motor will rotate in a forward direction, supplying the lock detection current to the driving motor.

\* \* \* \* \*